July 31, 1962  N. R. F. MORTIMER  3,046,998
TOBACCO PROCESSING MACHINERY
Filed Aug. 27, 1959 2 Sheets-Sheet 2
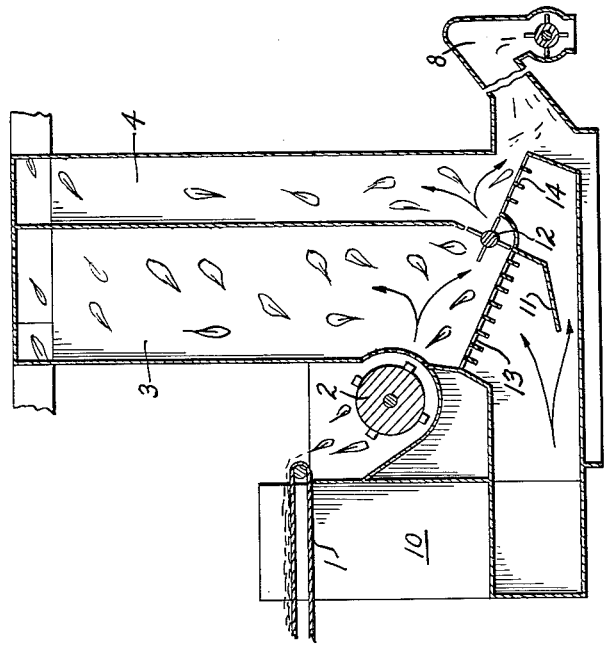
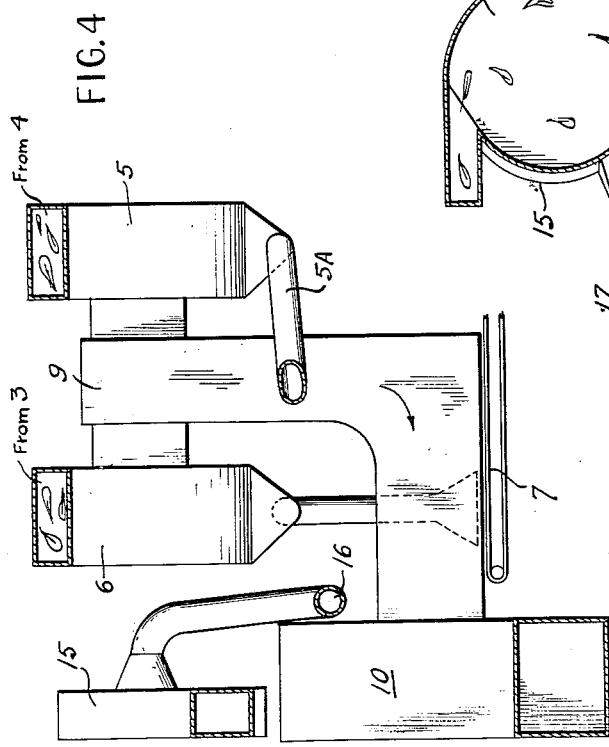
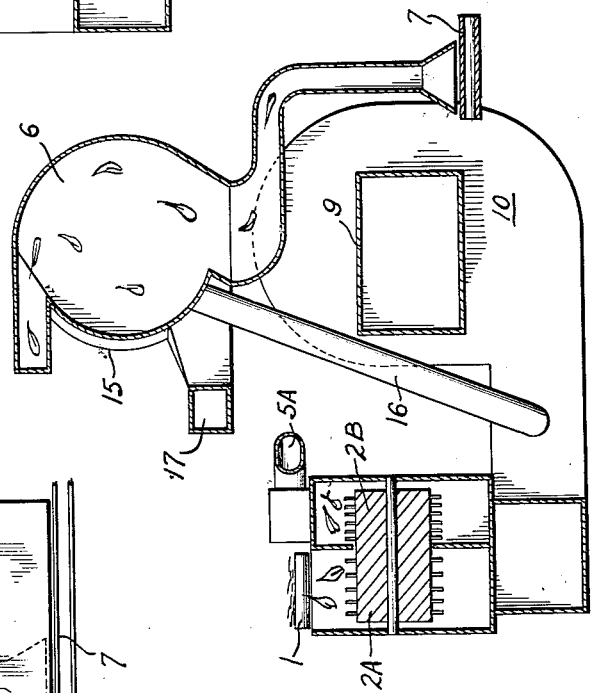
INVENTOR.
NOEL R. F. MORTIMER
BY
ATTORNEYS.

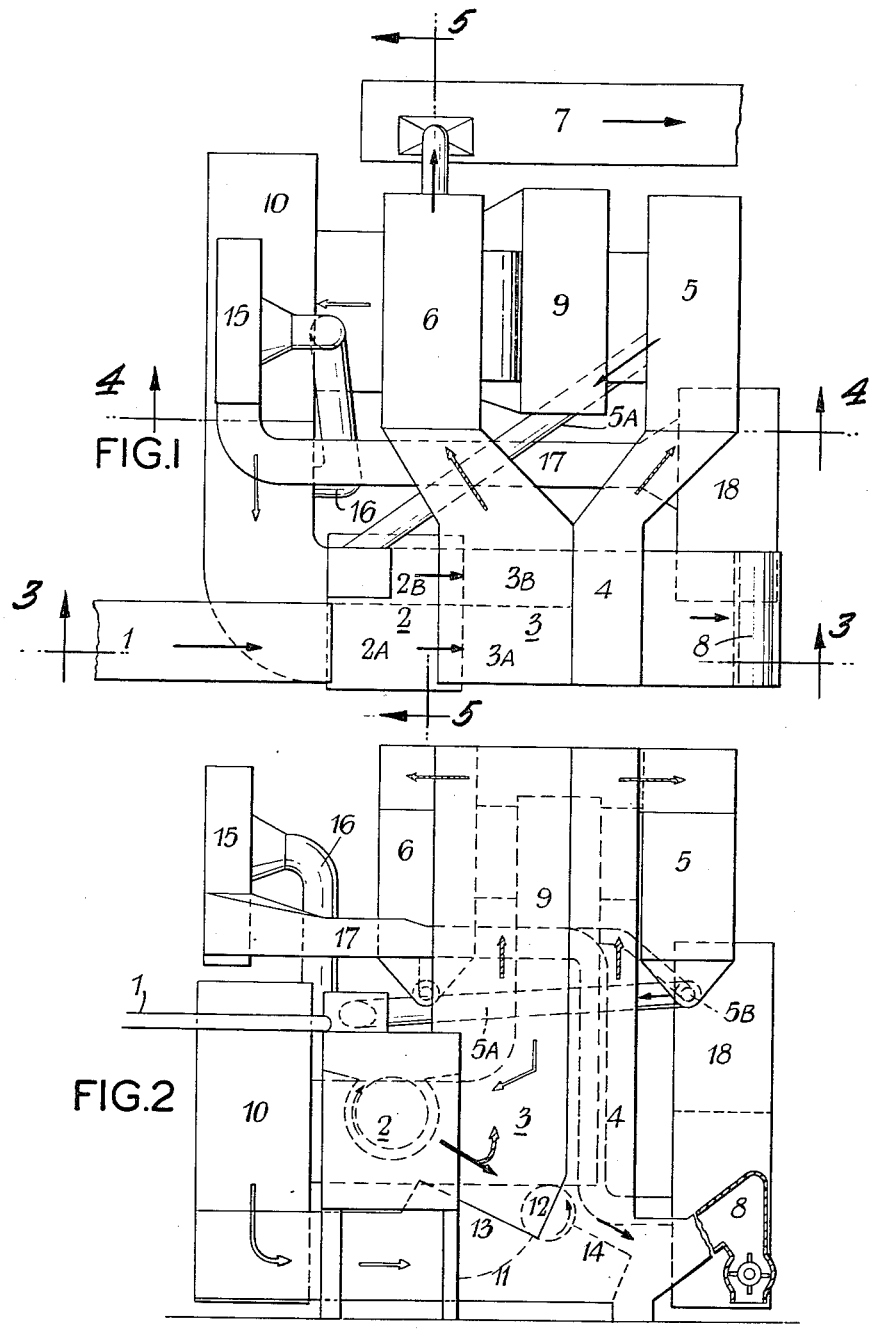

United States Patent Office 3,046,998
Patented July 31, 1962

3,046,998
TOBACCO PROCESSING MACHINERY
Noel R. F. Mortimer, Guildford, England, assignor to Vokes Limited, Surrey, England
Filed Aug. 27, 1959, Ser. No. 836,400
Claims priority, application Great Britain Aug. 27, 1958
3 Claims. (Cl. 131—146)

In applying threshing and pneumatic classifying systems for removing stem from wanted tobacco leaf, it is well known that threshing once, through a single machine, cannot remove all the wanted leaf unless it is broken to such small sizes as to be useless for many purposes. It is, therefore, usual to provide a number of successive threshing and classifying stages, the threshers being set to strip more closely as tobacco passes further through the plant. In this way, much leaf can be extracted from the early stages in quite large sizes, only the small remaining quantity being reduced to the small sizes as the stem is finally cleaned before being discarded. The stem, which has to pass all the threshers, may also be broken to small pieces in this process.

More recently, and particularly where the stem is required for further processing, systems of recirculation of partially stripped stalk have been introduced. These permit the plant to be reduced in length to (for example) two threshing stages, and pass stems (not cleaned at the outlet from the second stage) back to the second thresher for further processing. In this way stem length is preserved since many stems pass out without recirculating and having passed only two threshers. Leaf size can also be maintained, since the second stage thresher need not strip too closely. Plant cost and floor space can also be greatly reduced without any reduction of output quality.

Attempts have been made to reduce still further the cost and floor space requirement by recirculating partially stripped stalk through a single threshing stage. Success has not been obtained, since the difference in setting of the thresher and classifier to handle new leaf, and the recirculated threshed leaf, is too great, and suitable compromise settings cannot be attained.

It is the object of the present invention to overcome this difficulty and so to permit the construction of a simple and small single stage threshing and classifying machine, from which a produce of quality equal to that of the larger recirculating machinery can be obtained.

According to the invention we provide a tobacco leaf processing plant, of the kind wherein threshed leaf is carried on a perforated conveyor or chute through a pneumatic classifying duct, comprising a rotary drum thresher for reception of untreated tobacco divided in its width into fine and coarse threshing sections (new leaf being fed to the coarse threshing section), a pneumatic classifying duct similarly (if desired) divided to receive the outputs of the two threshing sections and to discharge cleaned leaf, and a recirculating duct spanning the whole width of the conveyor located beyond the pneumatic classifying duct to return all but stripped stems to the fine threshing section of the thresher, whereby only stripped stems pass the recirculating duct and all else but discharge clean leaf is re-threshed in the fine threshing section of the thresher.

The thresher may conveniently have a single driving shaft for both of its sections and its tooth length and spacing and grid design and aperture size differ in the fine and coarse sections to requisite degree.

The pneumatic classifying duct (possibly divided) and the recirculating duct may be served by a single fan with the airflow rate for each controlled (as by a preset damper) to suit their different desired lifting capacity.

In use, new leaf is continuously fed to the coarse side of the thresher, whilst the recirculator product is fed to the other side. The new leaf is threshed, classified by the pneumatic classifying duct to lift off the stripped leaf portions, and the remaining threshed product is lifted by the recirculator duct (except for cleaned stems), back to the fine part of the thresher. Here the product is again threshed, classified and lifted, except for clean stems, back to the fine part of the thresher. Cleaned stem discharge through an airlock or equivalent system at the downstream edge of the recirculator, whilst lifted leaf portions discharge through a suitable separator. The unit is then performing all the functions of a two stage threshing line with recirculation, with the additional feature that some stems can be discharged if cleaned after only a single threshing, and this is achieved with a great reduction of mechanical complexity and size of plant.

The above and other features of the invention are embodied in one form of tobacco processing machine which will now be described as an example with reference to the accompanying drawing in which:

FIG. 1 is a diagrammatic plan view,
FIG. 2 is a diagrammatic side elevation,
FIG. 3 is a vertical, sectional view on a smaller scale taken on line 3—3 of FIG. 1 and looking in the direction of the arrows; and
FIGS. 4 and 5 are similar vertical, sectional views taken on lines 4—4 and 5—5 respectively of FIG. 1 looking in the direction of the arrows.

Solid black arrows appearing in the drawing show the path followed by tobacco under the influence of gravity, mechanical means or blast produced by ejectors; crosshatched arrows indicate the path of air-borne tobacco; and arrows shown in outline indicate the path of air alone.

Referring now to the drawing a conveyor 1 feeds the material to be processed to the coarsely set side 2a of a divided thresher 2, which threshes the material to discharge directly into the first stage classifier duct 3, which may or may not be divided longitudinally by a division plate into sections 3a and 3b.

A vertical up-draught of air at a velocity of approximately 650–750 ft./min. in duct 3, serves to separate clean lamina from the stems and dirty lamina. The clean lamina is conveyed through the separator 6, whence it is discharged by air ejector or other convenient means to the take-off conveyor 7.

The stems and dirty lamina pass more or less horizontally through the first stage classifier, and are thrown into the recirculator duct 4 by a winnower 12. In this duct 4 the stem bearing lamina is separated from clean stems by an air draught of about 850–900 ft./min. velocity.

The dirty lamina is recirculated to the finely set side 2b of the divided thresher 2 via separator 5, by means of an air ejector 5b or other suitable means educting the lamina to a conduit 5a. It is thence reintroduced to the first classifier duct 3, or section 3b of this classifier, if a divided type is employed. In this classifier further separation of clean lamina from the stems takes place.

The dirty lamina and clean stems pass again to the common recirculator duct 4, where the process is repeated, as necessary, to secure adequate separation. The clean stem produced by the coarsely set side 2a of the thresher and those from the finely set side 2b are discharged from the unit via an airlock 8.

The system allows a large proportion of the stems to be discharged after only one threshing process, and this results in less comminution of the stems than might otherwise be the case.

The new material is constantly fed to the coarsely set side 2a of the thresher, and thus the process is continuous.

The classifier and recirculator ducts are fed from a common fan 10, and the air stream is then divided by the plate 11 into ducts 3 and 4. The plate 11 is suitably adjusted to secure correct apportionment of air flow between the two ducts to induce flows of the rates mentioned above.

The air for the first stage classification in duct 3 is passed through a stationary mesh screen 13 fixed at an angle to the horizontal. This angle is not critical, but, for example, 25° has been found satisfactory in practice. The air for the recirculator duct 4 passes through another stationary mesh screen 14, which may be either inclined (as shown) or horizontal. The conveying air for the classifier and recirculator passes into a common duct 9 after passing through the respective separators, and is thence returned to the fan 10.

The system, therefore, is a closed circuit, but to remove dust produced by the processing or otherwise entering the system, a bleed of approximately 10% drawn through a conduit 16 from the discharge side of fan 10 is taken through duct 17 to a suitable dust collector 18. This flow is normally induced by a secondary fan 15 which can also, if desired, supply the necessary air for the ejectors above referred to.

I claim:

1. A tobacco leaf processing plant comprising a rotary drum thresher having a coarse shredder to which fresh leaf is fed and a fine shredder, said shredders being laterally displaced on the same shaft, a classifying duct receiving the discharge of both said shredders, pneumatic means for separating cleaned leaf from the tobacco discharged by said shredders and forcing the cleaned leaf along the classifying duct to a first discharge outlet, a second outlet approximate to the lower end of the classifying duct for discharging unclean leaf and stripped and unstripped stems, a recirculating duct receiving the discharge from said second outlet, pneumatic means for forcing air in a location immediately past said second outlet and for occasioning a separation of the stripped stems from the unstripped stems and unclean leaf in said recirculating duct, said recirculating duct being arranged to return the unstripped stems together with unclean leaf to said fine shredder, and an outlet in the recirculating duct near the bottom thereof for discharge of the stripped stems.

2. A plant according to claim 1 wherein a single pneumatic means serves both the classifying duct and the recirculating duct.

3. A plant according to claim 2 in which means are provided outside the classifying and recirculating ducts to effect a difference in the rate of flow of air through these ducts.

References Cited in the file of this patent

UNITED STATES PATENTS

| 2,148,015 | Dittrich | Feb. 21, 1939 |
| 2,697,439 | Davis | Dec. 21, 1954 |

FOREIGN PATENTS

| 540,188 | Germany | Dec. 8, 1931 |
| 968,672 | Germany | Mar. 20, 1958 |